United States Patent

Kubota et al.

[11] Patent Number: 5,937,740
[45] Date of Patent: Aug. 17, 1999

[54] AUTOMATIC BREAD MAKER

[75] Inventors: Ikuya Kubota; Takashi Oya, both of Nagano-ken, Japan

[73] Assignee: MK Seiko Co., Ltd., Koshoku, Japan

[21] Appl. No.: 09/136,615

[22] Filed: Aug. 20, 1998

[30] Foreign Application Priority Data

Apr. 13, 1998 [JP] Japan .................................. 10-100710

[51] Int. Cl.$^6$ ............................. A21B 1/00; A21D 8/00; A47J 27/10; A23L 1/00
[52] U.S. Cl. ................................ 99/327; 99/339; 99/340; 99/348; 99/476; 366/146; 366/314; 366/601; 219/401
[58] Field of Search .......................... 99/326–334, 339, 99/340, 348, 404–412, 415, 450, 476, 477, 468; 364/400; 366/98, 314, 601, 144–146; 219/400, 401; 126/21 A, 20; 426/523, 509–511, 504, 512

[56] References Cited

U.S. PATENT DOCUMENTS

| | | | |
|---|---|---|---|
| 4,844,048 | 7/1989 | Aruga et al. | 99/348 X |
| 5,531,153 | 7/1996 | Maruyama et al. | 99/327 |
| 5,588,352 | 12/1996 | Harrison | 99/339 |
| 5,590,583 | 1/1997 | Harrison | 99/327 |

Primary Examiner—Timothy F. Simone
Attorney, Agent, or Firm—Greenblum & Bernstein P.L.C.

[57] ABSTRACT

A bread maker wherein a bread vessel, having breadstuff charged therein, is mounted within an oven chamber having a heater, a kneader and a temperature sensor, and a kneading step, a fermentation step and a baking step are automatically effected, thereby making bread, comprises; a steaming plate for producing steam within the oven chamber; a cooking plate for supporting shaped dough pieces thereon can be removably mounted within the oven chamber in exchange for the bread vessel; and a fan device for convecting heat, generated by the heater, within the oven chamber.

14 Claims, 5 Drawing Sheets

ORDINARY BREAD COURSE

BAGEL COURSE

AUTOMATIC BREAD MAKER

BACKGROUND OF THE INVENTION

This invention relates to an automatic bread maker in which bread can be automatically made by charging breadstuff into a bread vessel, and besides a steaming function is added so as to easily make bagels.

There is already known a bread maker in which a desired menu is selected from a plurality of bread-making menus, and required breadstuff is put into a bread vessel, and merely by doing so, a bread-making process, comprising a kneading step of kneading the breadstuff, a fermentation step of fermenting dough, a degassing step of deflating the expanded dough, a shaping-fermentation step of expanding the dough into a shape of the bread, and a baking step of baking the expanded dough, is performed in a sequential manner, thereby automatically making the bread. There is also known such a device of the type in which in addition to a menu for effecting the entire process including a bread-baking step, a dough-making menu for effecting a process from a kneading step to a primary fermentation step is provided, so that bagels and pizza can be prepared.

However, such a bread maker does not have the function of baking bagels. Generally, when making bagel bread, dough is kneaded, and is fermented, and after the fermentation, the dough is divided into sections or pieces, and these are formed into a doughnut-shape, and these are again fermented, and then are boiled in hot water of about 90° C., and then are baked. A feature of this bread is that the dough is boiled in hot water for 30 seconds to 1 minute before the dough is baked. This is effected so as (1) to instantaneously suppress the fermentation and expansion of the dough, (2) to gelatinize starch in the dough and (3) to gelatinize the surface of the dough, and as a result the resistance to the teeth and a fresh baking color, which are inherent to the bagel bread, are obtained.

From results of tests conducted by Applicant, of the present application, it has been found that the boiling of the bagel dough can be replaced by steaming. The bagel bread, prepared by baking the steamed dough, had almost the same resistance to the teeth and the same baking color as that prepared by baking the boiled dough. Based on these findings, Applicant of the present application has earlier filed Japanese Patent Application No. Hei. 9-123181, and has proposed a bread maker in which there is provided steam producing means for producing steam within an oven, and there is provided a bagel bread course in which charged bagel dough is steamed, and then is baked.

In a baking step of such a bagel bread course, the bagel dough is baked by heat generated by a heater provided at an inner bottom portion of the oven, and particularly when the bagel dough pieces are set or arranged in a multi-stage manner within the oven, there has been encountered a problem the bagel dough pieces are subjected to uneven baking, depending on their locations within the oven.

SUMMARY OF THE INVENTION

It is therefore an object of the invention to provide an automatic bread maker which is provided with a steaming function so that bagel bread dough can be baked evenly.

According to one aspect to the present invention, there is provided a bread maker wherein a bread vessel, having breadstuff charged therein, is mounted within an oven chamber having a heater, a kneader and a temperature sensor, and a kneading step, a fermentation step and a baking step are automatically effected, thereby making bread; wherein steam producing means for producing steam within the oven chamber and a cooking plate for supporting shaped dough pieces thereon can be removably mounted within the oven chamber in exchange for the bread vessel, and there is provided a fan device for convecting heat, generated by the heater, within the oven chamber.

According to another aspect to the invention, there is provided a bread maker wherein a bread vessel, having breadstuff charged therein, is mounted within an oven chamber having a heater, a kneader and a temperature sensor, and a kneading step, a fermentation step and a baking step are automatically effected, thereby making bread, the bread maker comprising: memory means storing a plurality of bread-making courses; selection means for selecting one of the courses stored in the memory means; start means for executing the bread-making course selected by the selection means; telling means for telling the finish of the bread-making operation, and so on; steam producing means for producing steam within the oven chamber; at least one cooking plate for supporting shaped dough pieces thereon; and a fan device for convecting heat, generated by the heater, within the oven chamber, wherein the memory means stores a bagel bread menu in which a process, ranging from the kneading step to a step immediately before a shaping-fermentation step, is effected, and subsequently the bread-making operation is once stopped, and also this stop is told by the telling means, and subsequently the bread-making operation is resumed by the start means, and subsequently a process, ranging from the shaping-fermentation step through a steaming step to the baking step, is effected.

Preferably, the heater of a frame-like configuration is provided at a lower portion of the oven chamber having a box-shape, and is disposed along an inner peripheral surface of the oven chamber so as to surround the bread vessel, and a suction port of the fan device is open to that portion of the inner peripheral surface of the oven chamber disposed in the vicinity of the heater, and a blowout port of the fan device is open to that portion of the inner peripheral surface of the oven chamber disposed in the vicinity of an upper end of the oven chamber.

Preferably, the steam producing means comprises a box-shaped plate member with a closed bottom, and an outer peripheral portion of a bottom of the plate member is recessed with respect to a central portion of this bottom to form a groove portion for holding steam-producing water, and the plate member is supported on an upper surface of the heater.

Preferably, the cooking plate (bagel plate) comprises a plate having vent holes formed therethrough, and a deflection plate is formed on an upper edge of that portion of the cooking plate which is disposed close to the blowout port of the fan device when the cooking plate is placed on an upper surface of the steam producing means, and the deflection plate deflects hot air from the fan device so that the hot air will not be applied directly to the dough placed on the cooking plate.

Preferably, there is provided a mounting member for introducing the cooking plate into the oven chamber, and the mounting member is made of a flat plate, and has a handgrip at its one end, and the other end portion of the mounting member is bent downwardly perpendicularly to form an introduction plate portion, and a distal end portion of the introduction plate portion is bent in parallel relation to the one end portion of the flat plate in a direction away from the handgrip to form an insertion plate portion for insertion into the cooking plate, and one or more additional insertion plate portions are formed on the introduction plate portion in parallel relation to the insertion plate portion.

Preferably, a bread vessel support portion for supporting the bread vessel is formed at the bottom of the oven chamber, and the support portion interconnects a rotation shaft, extending into the interior of the bread vessel, and the kneader, and there is provided a hollow cylindrical cover which shields the bread vessel support portion from heat.

In the bread maker of the present invention, the bread vessel, having breadstuff charged therein, is set within the oven chamber, and the bagel bread course is selected, and the break-making operation is started. The kneading step, the fermentation step and the degassing step are sequentially effected, thereby producing bagel dough. The telling means is operated, and the operation of the bread maker is once stopped, and the bagel dough is removed from the bread vessel, and is formed or shaped into doughnut-shaped dough pieces. The shaped bagel dough pieces are arranged on the bagel plates (cooking plates), and the bagel plates are mounted on the steam plate holding water. Then, the operation is resumed by the start means, and the heater is energized, and the water in the steam plate is evaporated to steam the bagel dough pieces. Thereafter, the fan device is driven, and heat, generated by the heater, is convected upwardly and downwardly within the oven chamber, and therefore is applied uniformly to the bagel dough pieces, thereby baking these dough pieces.

Therefore, the bagel dough pieces can be uniformly baked regardless of the position of these dough pieces on the bagel plate, and there is provided the bagel course in which the steaming step is effected before the baking step, and therefore the bagel bread can be baked by the bread maker without increasing the size and cost of the bread maker, and the complicated operation is simplified, and the bagel bread can be easily prepared.

DETAILED DESCRIPTION OF THE PREFERRED EMBODIMENTS

A preferred embodiment of the present invention will now be described with reference to the drawings.

Figure 1:
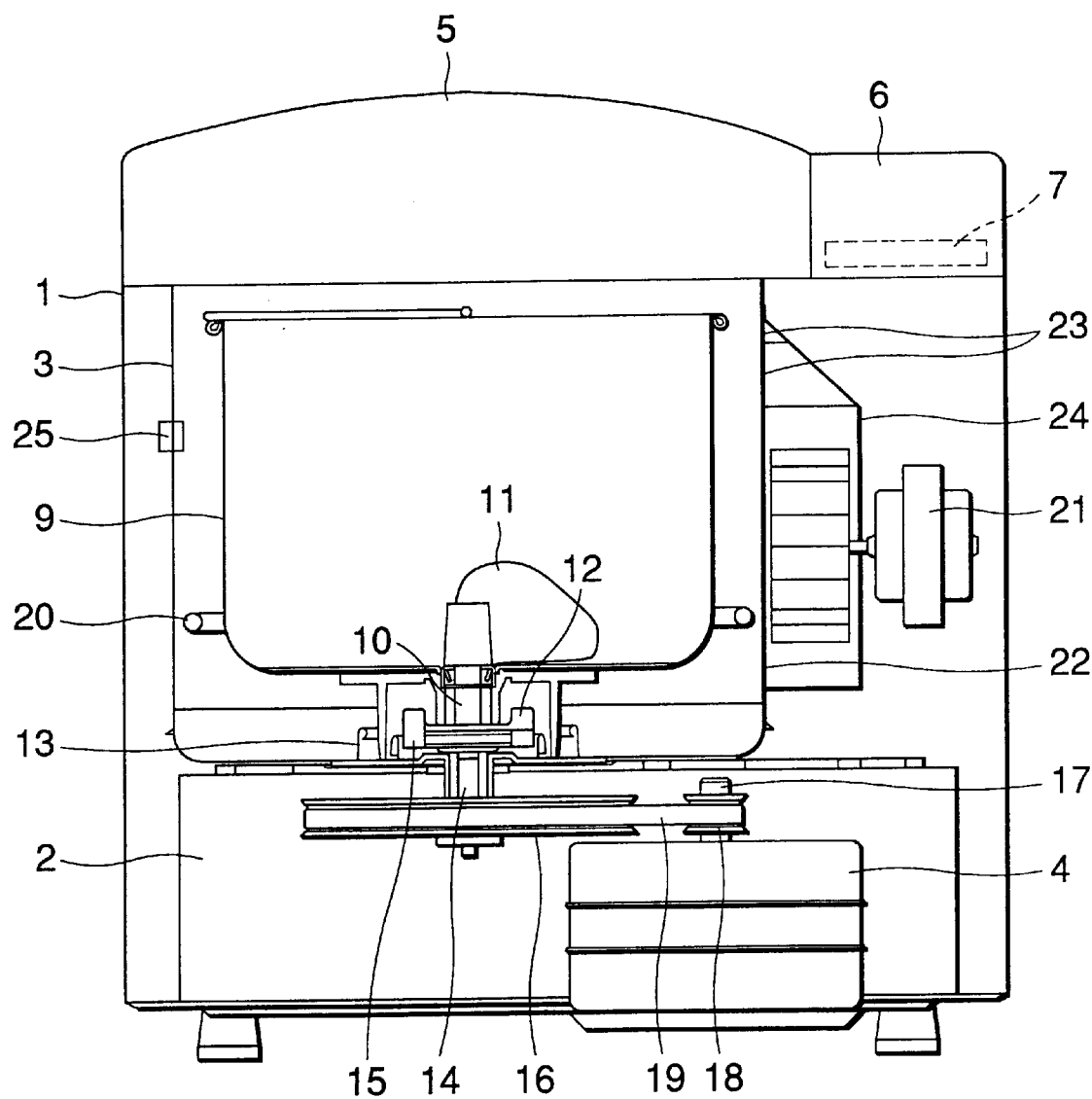
FIG. 1 is a cross-sectional view showing the interior of a bread maker of the present invention during a bread-making operation.

FIG. 1 is a cross-sectional view showing the interior of a bread maker of this embodiment during a bread-making operation. A base 2 is fixedly mounted on a bottom of a bread maker body 1, and an oven chamber 3 is provided on an upper surface of the base 2, and a motor 4 is provided on a bottom portion of the base 2. A lid 5 is openably and closably mounted at an upper side of the oven chamber 3. A board casing 6 is mounted on the body 1, and is disposed above the motor 4, and this board casing 6 contains a control circuit board 7 therein, and has an operation panel 8 mounted on an upper surface thereof. A bread vessel 9, into which various kinds of breadstuffs can be charged, has a rectangular cross-section, and has a rotation shaft 10 provided in a projected manner at a central portion thereof. A kneading blade 11 is mounted on an upper end of the rotation shaft 10, and a coupling 12 is mounted on a lower end of the rotation shaft 10.

A support portion 13 is provided at the bottom surface of the oven chamber 3, and removably supports the bread vessel 9. A drive shaft 14 extends through a central portion of the support portion 13, and a coupling 15 for engagement with the coupling 12 of the bread vessel 9 is mounted on an upper end of the drive shaft 14, and a large pulley 16 is mounted on a lower end of the drive shaft 14, and this pulley 16 is connected via a V-belt 19 to a small pulley 18 mounted on a drive shaft 17 of the motor 4.

A heater 20 is provided substantially horizontally within the oven chamber 3 at a lower portion thereof in surrounding relation to the bread vessel 9. A fan device 21 is mounted on that portion of an outer surface of the oven chamber 3 disposed generally beneath the board casing 6, and its fan member is contained in a casing 24 which has a suction port 22 open to that portion of the inner surface of the oven chamber 3 disposed in the vicinity of the heater 20, and blowout ports 23 open to that portion of the inner surface of the oven chamber 3 disposed in the vicinity of an open top of the oven chamber 3. A temperature sensor 25 is mounted on that portion of the wall surface of the oven chamber 3 disposed in opposed relation to that portion thereof on which the fan device 21 is mounted, and this temperature sensor 25 monitors the temperature within the oven chamber 3.

Figure 2:
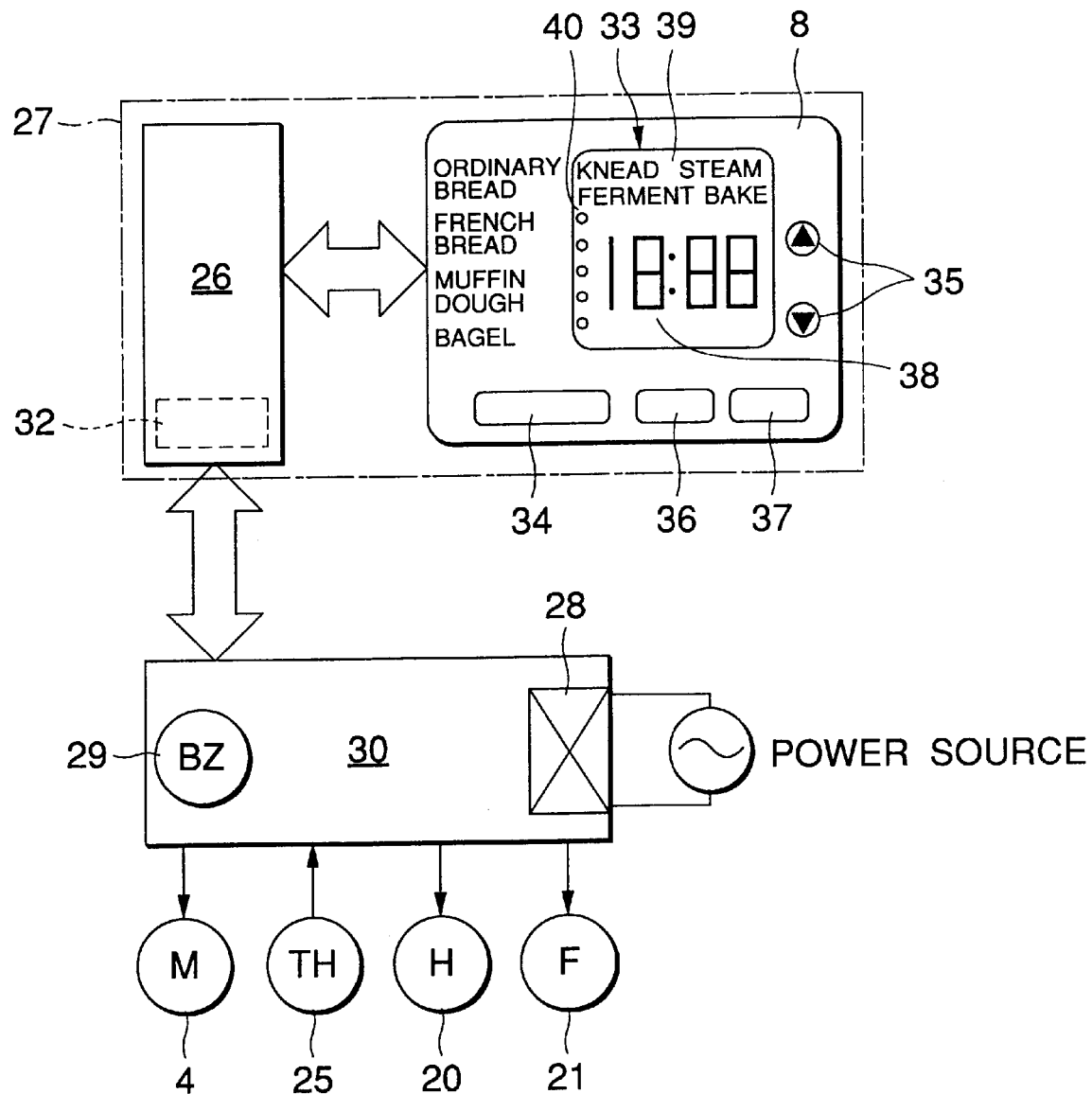
FIG. 2 is a block diagram of a control system of the bread maker of FIG. 1.

FIG. 2 is a block diagram showing a control system of the present invention. The control board 7 includes a microcomputer board 27, having a microcomputer 26 and the operation panel 8, and a power board 30 having a transformer 28 and a buzzer 29. The microcomputer 27 contains a memory 32 storing executive programs for bread-making courses, and the operation panel 8 and the power board 30 are connected to the microcomputer 27. The motor 4, the temperature sensor 25, the heater 20 and the fan device 21 are connected to the power board 30. With this construction, the program is read from the memory 32 in accordance with the bread-making menu selected through the operation panel 8, and the motor and the heater are controlled to be driven in accordance with this program.

The operation panel 8 is provided with a display portion 33 comprising an LCD, a course key 34 for selecting the bread-making course, timer keys 35 for setting a time of a timer, a start key 36 for starting the operation, and a stop key 37 for stopping the operation. The display portion 33 includes a time display portion 38 for displaying a bread-making time in terms of a segment, a step display portion 39 for displaying a step in the process of being effected at present, and a course display portion 40 for displaying the selected bread-making course. A bagel course according to the embodiment of the invention as well as an ordinary bread course, a French bread course, a muffin course, and a dough course, which can be selected by the menu key 34, can be displayed on the course display portion 40.

Figure 3:
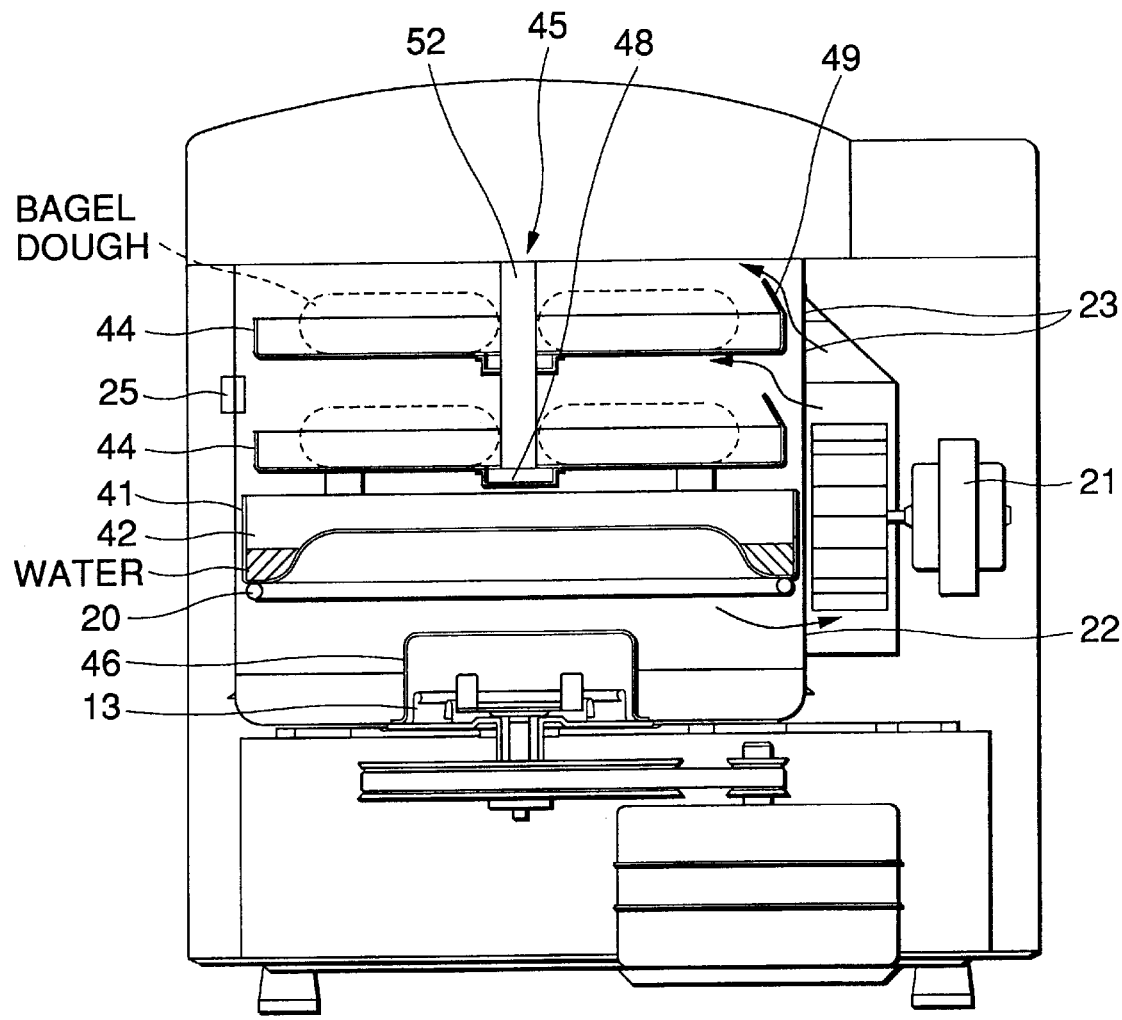
FIG. 3 is a cross-sectional view showing the interior of the bread maker of FIG. 1 during the production of bagel.

FIG. 3 is a cross-sectional view showing the interior of the bread maker of this embodiment during the baking of a bagel dough. A steam plate (steam producing device) 41 has a box-shape with a closed bottom, and an outer peripheral portion of the bottom of this steam plate 41 is recessed with respect to a central portion (i.e., the remainder) of this bottom to form a groove portion 42 for holding water, and handgrips 43 are formed on and extend between upper edges of opposite longer side walls of the steam plate 41. The steam plate 41 is placed on an upper surface of the heater 20. Bagel dough pieces, formed into a doughnut-shape, are placed or arranged on bagel plates 44 and 44, and the bagel plates 44 are placed or supported in a vertically-spaced manner (that is, in two stages) within the oven chamber 3 by a mounting member 45. A hollow cylindrical cover 46 shields the bread vessel support portion 13, provided within the oven chamber 3, from heat, and prevents the drive system from being adversely affected by the high-temperature heat produced during the baking of the bagel dough. In order that the user will not forget to set this cylindrical cover 46, and will not lose it, the cylindrical cover 46 may be formed integrally on the bottom or lower surface of the steam plate 41.

Figure 4:
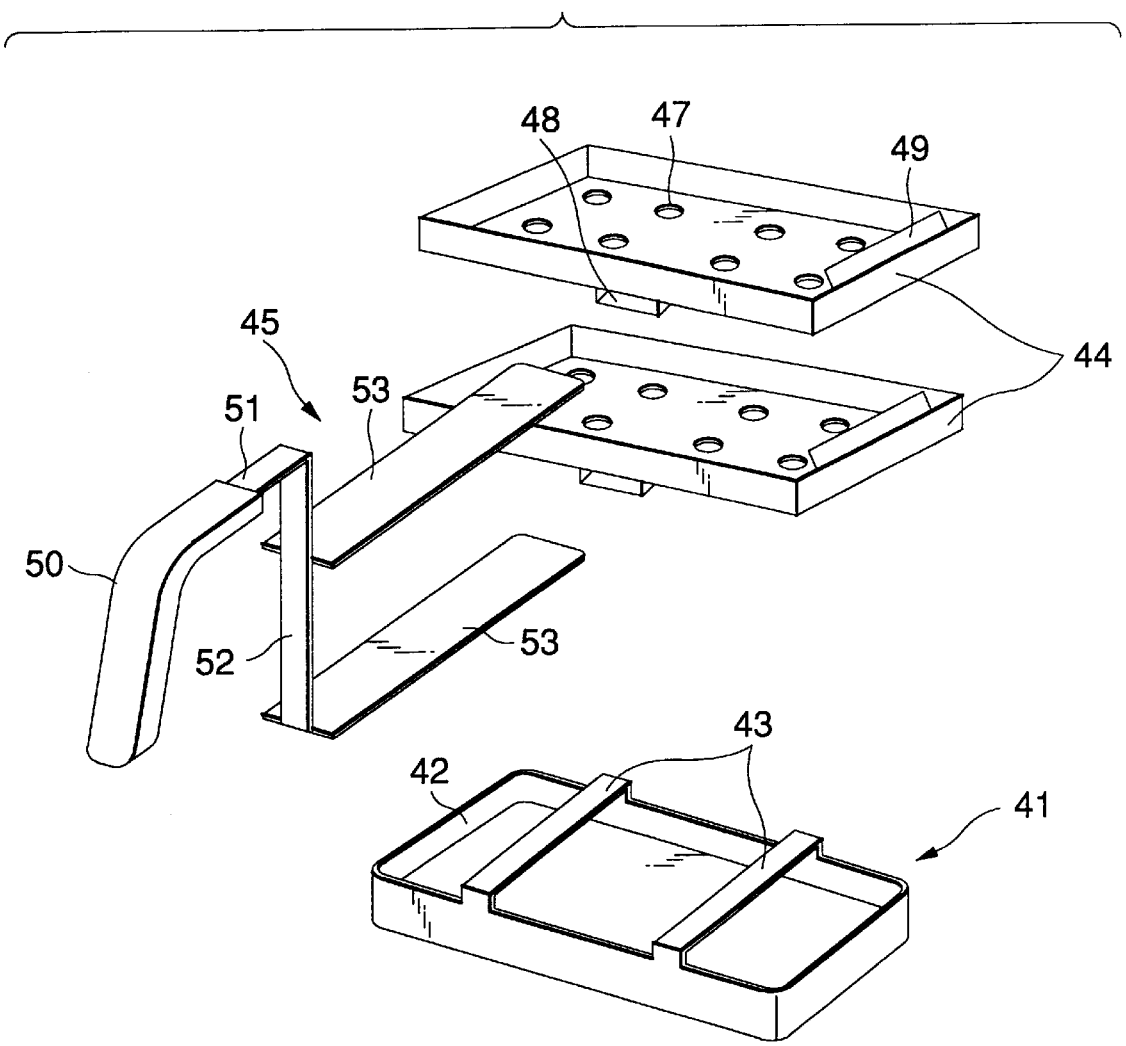
FIG. 4 is a view showing a steam plate, a bagel plate and a mounting member used in the bread maker of FIG. 1.

As shown in FIG. 4, the bagel plate 44 has a plurality of vent holes 47 formed through a bottom thereof, and a mounting frame 48 for receiving a portion of the mounting member 45 is formed on a lower surface of the bottom of the bagel plate 44. A deflection plate 49 is formed on an upper edge of that short side wall of the bagel plate 44 which is disposed close to the blowout port 23 of the fan device 21 when the bagel plate 44 is placed within the oven chamber 3, and this deflection plate 49 deflects the hot air from the fan device 21 so that the hot air will not impinge directly on the bagel dough.

The mounting member 45 is made of a thin flat plate or sheet, and has at its one end a handgrip plate portion 51 having a handgrip 50 of an inverted L-shape, and the other end portion of the mounting member 45 is bent downwardly perpendicularly relative to the handgrip portion 51 to form an introduction plate portion 52 for introduction into the oven chamber 3, and a distal end portion of the introduction plate portion 52 is bent horizontally in a direction away from the handgrip plate portion 51 to form an insertion plate portion 53 for insertion into the mounting frame 48. Another insertion plate portion 53 is formed on the introduction plate portion 52 intermediate the opposite ends thereof so that the two bagel plates 44 can be arranged in parallel, vertically-spaced relation to each other, but the number of the insertion plate portions 53 is not limited to any specified number.

Figure 5A:
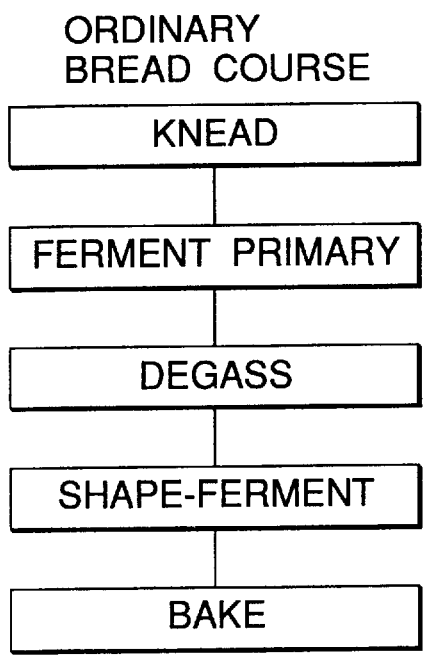
FIGS. 5(a) and 5(b) are flow charts showing the operations of the break maker of FIG. 1.

Next, a method of operating the bread maker of the invention will be described. For making ordinary bread by this bread maker, breadstuff for this bread is charged into the bread vessel 9, and "the ordinary bread course" is selected by the course key 34 on the operation panel 8, and the start key 36 is depressed. In the ordinary bread course, a kneading step, a fermentation step, a degassing step, a shaping-fermentation step and a baking step are sequentially effected as shown in FIG. 5(a), and the ordinary bread is made or prepared after a predetermined period of time. This process is the same as that performed by the conventional bread maker.

Figure 5B:
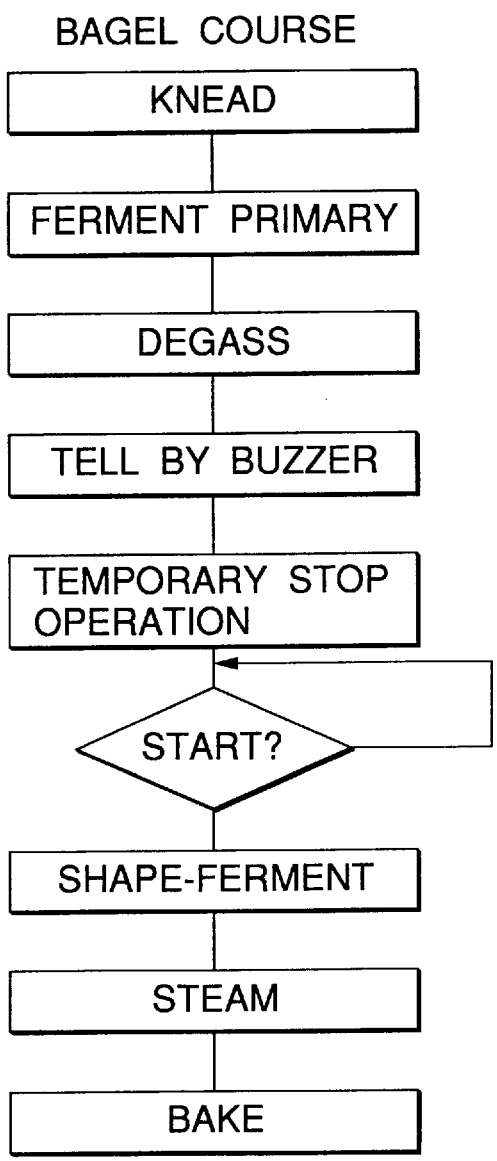

On the other hand, for making bagel bread by this bread maker, bagel breadstuff is charged into the bread vessel 9, and "the bagel course" is selected by the course key 34, and the start key 36 is depressed, so that the break-making operation is effected in accordance with the sequence shown in FIG. 5(b). More specifically, a kneading step and a primary fermentation step are first effected in the bread vessel 9. In the kneading step, a varying-speed operation is effected, in which flour is stirred at a low rotational speed of the motor 4, and then the rotational speed is gradually increased. In the primary fermentation step, the motor 4 is stopped, and based on a signal from the temperature sensor 25, the interior of the oven chamber 3 is maintained at a fermentation temperature. In the degassing step, the speed of the motor 4 is so controlled that the motor 4 is driven sequentially at a medium speed, a low speed and a medium speed.

After the degassing step is finished, the buzzer 29 produces a sound, and the operation is once stopped. In this stopped condition, the user removes the bagel dough from the bread vessel 9, and forms it into doughnut-shaped dough pieces, and arranges these dough pieces on the bagel plates 44. The cylindrical cover 46 is introduced into the oven chamber 3 to cover the bread vessel support portion 13, and the steam plate 41, holding a predetermined amount of water in the groove portion 42, is placed on the upper surface of the heater 20. Finally, the bagel plates 44, having the bagel dough pieces arranged thereon, are attached to the mounting member 45, and are set within the oven chamber 3. The right-angled corner portion, defined by the handgrip plate portion 51 and the introduction plate portion 52 of the mounting member 45, is supported on the upper edge of the oven chamber 3, and also the lower bagel plate 44 rests on the handgrips 43 of the steam plate 41. In this manner, the bagel plates 44 are properly set within the oven chamber 3.

Thereafter, the lid 5 for the oven chamber 3 is closed, and the start key is again depressed, a shaping-fermentation step, a steaming step and a baking step are sequentially effected. In the shaping-fermentation step, the temperature within the oven chamber 3 is maintained at a fermentation temperature, which is equal to or slightly higher than that of the primary fermentation step, for a time period shorter than that of the primary fermentation step. In the steaming step, the heater 20 is more energized to heat the steam plate 41 placed on the upper surface of this heater 20, and steam is produced from the water held in the steam plate 41, so that the dough pieces are steamed. In the baking step, the fan device 21 is driven, and the bagel dough is baked while convecting the heat generated by the heater 20.

The steam, produced during the steaming step, is applied uniformly to the dough pieces through the vent holes 47 formed through the bagel plates 44, thus creating a uniform steaming condition, and is discharged through exhaust holes in the lid 5. The temperature within the oven chamber 3 rises up to about 100° C., so that yeast in the dough is extinguished, and therefore the fermentation is stopped, and also the gas in the dough is expanded, thereby suppressing the expansion of the dough during the baking. The heat, produced by the heater 20 during the baking step, is circulated from the suction port 22 (disposed in the vicinity of the heater 20) to the blowout ports 23 by the fan device 21, and is convected within the oven chamber 3. Those bagel dough pieces, disposed near to the blowout ports 23, will not directly undergo the hot air because of the provision of the deflection plates 49 of the bagel plates 44, and therefore will not be scorched.

We claim:

1. A bread maker including a bread vessel, for breadstuff to be charged therein, the bread vessel being positionable within an oven chamber having a heater, a kneader and a temperature sensor, and including a memory storage device for automatically effecting kneading, fermentation, and baking of the breadstuff to thereby make bread, said bread maker further comprising;

a steam producing device for producing steam within said over chamber;

at least one cooking plate for supporting shaped dough pieces thereon in spaced relation to said steam producing device at all times, said at least one cooking plate being removably mountable within said oven chamber in exchange for said bread vessel; and a fan device for convecting heat, generated by said heater, within said oven chamber.

2. The bread maker according to claim 1, wherein said heater is configured to have a frame-shape and is provided at a lower portion of said oven chamber, said oven chamber having a box-shape, and said heater being disposed along an inner peripheral surface of said oven chamber so as to surround said bread vessel, and a suction port of said fan device is open to a portion of the inner peripheral surface of said oven chamber disposed in the vicinity of said heater, and a blowout port of said fan device is open to a portion of said inner peripheral surface of said oven chamber disposed in the vicinity of an upper end of said oven chamber.

3. The bread maker according to claim 1, wherein said steam producing device comprises a box-shaped plate member having a closed bottom, and an outer peripheral portion of said bottom of said plate member is recessed with respect to a central portion thereof to form a groove portion for holding steam-producing water, and said plate member is supported on an upper surface of said heater.

4. The bread maker according to claim 1, wherein said cooking plate comprises a plate having vent holes formed therethrough, and a deflection plate is provided on an upper edge of a portion of said cooking plate which is disposed close to a blowout port of said fan device when said cooking plate is placed on an upper surface of said steam producing device, and said deflection plate deflects hot air from said fan device so that the hot air will not be applied directly to dough placed on said cooking plate.

5. The bread maker according to claim 1, wherein a mounting member for introducing said cooking plate into said oven chamber is provided, said mounting member being formed of a flat plate and includes a handgrip at one end portion thereof, the other end portion of said mounting member being bent downwardly perpendicularly to form an introduction plate portion, and a distal end portion of said introduction plate portion being bent in parallel relation to the one end portion of said flat plate in a direction away from said handgrip to form an insertion plate portion for insertion into said cooking plate, and at least one additional insertion plate portion is formed on said introduction plate portion in parallel spaced relation to said insertion plate portion.

6. The bread maker according to claim 1, wherein a bread vessel support portion for supporting said bread vessel is formed at the bottom of said oven chamber, and said support portion interconnects a rotation shaft and said kneader, the rotation shaft extending into the interior of said bread vessel, and a hollow cylindrical cover is provided to shield said bread vessel support portion from heat.

7. The bread maker according to claim 6, wherein said hollow cylindrical cover is formed integrally on a lower surface of said plate member of said steam producing device.

8. A bread maker including a bread vessel, for breadstuff to be charged therein, the bread vessel being positionable within an oven chamber having a heater, a kneader and a temperature sensor, and including a memory storing device for automatically effecting kneading, fermentation, and baking of the breadstuff to thereby make bread, said bread maker further comprising:

a memory device for storing a plurality of bread-making courses;

a selection device for selecting one of said courses stored in said memory device;

a start device for executing a bread-making course selected by said selection device;

an informing device for informing of the finish of the bread-making operation and for informing of selected intermediate operations;

a steam producing device for producing steam within said oven chamber;

at least one cooking plate for supporting shaped dough pieces thereon; and a fan device for convecting heat, generated by said heater, within said oven chamber;

wherein said memory device stores a bagel bread menu for effecting a process including kneading, primary fermentation, and degassing, for subsequently stopping the bread-making operation, actuating said informing means to inform of the stopping, subsequently resuming the bread-making operation by said start device, and subsequently effecting a process, including shaping-fermentation, steaming, and baking.

9. The bread maker according to claim 8, wherein said heater is configured to have a frame-shape and is provided at a lower portion of said oven chamber, said oven chamber having a box-shape, and said heater being disposed along an inner peripheral surface of said oven chamber so as to surround said bread vessel, and a suction port of said fan device is open to a portion of the inner peripheral surface of said oven chamber disposed in the vicinity of said heater, and a blowout port of said fan device is open to a portion of said inner peripheral surface of said oven chamber disposed in the vicinity of an upper end of said oven chamber.

10. The bread maker according to claim 8, wherein said steam producing device comprises a box-shaped plate member having a closed bottom, and an outer peripheral portion of said bottom of said plate member is recessed with respect to a central portion thereof to form a groove portion for holding steam-producing water, and said plate member is supported on an upper surface of said heater.

11. The bread maker according to claim 8, wherein said cooking plate comprises a plate having vent holes formed therethrough, and a deflection plate is provided on an upper edge of a portion of said cooking plate which is disposed close to a blowout port of said fan device when said cooking plate is placed on an upper surface of said steam producing device, and said deflection plate deflects hot air from said fan device so that the hot air will not be applied directly to dough placed on said cooking plate.

12. The bread maker according to claim 8, wherein a mounting member for introducing said cookie plate into said oven chamber is provided, said mounting member formed of a flat plate and including a handgrip at one end portion thereof, the other end portion of said mounting member being bent downwardly perpendicularly to form an introduction plate portion, and a distal end portion of said introduction plate portion being bent in parallel relation to the one end portion of said flat plate in a direction away from said handgrip to form an insertion plate portion for insertion into said cooking plate, and at least one additional insertion plate portion is formed on said introduction plate portion in parallel spaced relation to said insertion plate portion.

13. The bread maker according to claim 8, wherein a bread vessel support portion for supporting said bread vessel is formed at the bottom of said oven chamber, and said support portion interconnects a rotation shaft and said kneader, the rotation shaft extending into the interior of said bread vessel, and a hollow cylindrical cover is provided to shield said bread vessel support portion from heat.

14. The bread maker according to claim 13, wherein said hollow cylindrical cover is formed integrally on a lower surface of said plate member.

* * * * *

UNITED STATES PATENT AND TRADEMARK OFFICE
CERTIFICATE OF CORRECTION

PATENT NO. : 5,937,740
DATED : August 17, 1999
INVENTOR(S) : I. KUBOTA et al.

It is certified that error appears in the above-identified patent and that said Letters Patent is hereby corrected as shown below:

column 6, line 62 (claim 1, line 9) of the printed patent, "over" should be ---oven---.

column 8, line 65 (claim 14, line 3) of the printed patent, after "member" insert ---of said steam producing device---.

Signed and Sealed this

Twenty-fourth Day of October, 2000

Attest:

Q. TODD DICKINSON

*Attesting Officer*       *Director of Patents and Trademarks*